US012589881B2

(12) United States Patent
Ackerman et al.

(10) Patent No.: US 12,589,881 B2
(45) Date of Patent: *Mar. 31, 2026

(54) CO-CURED UV/VISIBLE LIGHT-RESISTANT COATED COMPOSITE MATERIAL FOR AIRCRAFT WING FUEL TANK ASSEMBLY

(71) Applicant: The Boeing Company, Arlington, VA (US)

(72) Inventors: Patrice K. Ackerman, Kent, WA (US); Melinda D. Miller, Snohomish, WA (US); Jason A. Bolles, Kent, WA (US)

(73) Assignee: THE BOEING COMPANY, Arlington, VA (US)

( * ) Notice: Subject to any disclaimer, the term of this patent is extended or adjusted under 35 U.S.C. 154(b) by 393 days.

This patent is subject to a terminal disclaimer.

(21) Appl. No.: 18/171,493

(22) Filed: Feb. 20, 2023

(65) Prior Publication Data

US 2023/0312125 A1 Oct. 5, 2023

Related U.S. Application Data

(63) Continuation-in-part of application No. 17/708,207, filed on Mar. 30, 2022, now Pat. No. 12,466,574.

(51) Int. Cl.
*B64D 37/06* (2006.01)
*B64C 3/34* (2006.01)

(52) U.S. Cl.
CPC ................ *B64D 37/06* (2013.01); *B64C 3/34* (2013.01)

(58) Field of Classification Search
CPC .......... B64D 37/06; B64D 37/04; B64C 3/34; B64C 2001/0072; B64F 5/10; B32B 2255/28; B32B 2260/021; B32B 2260/023; B32B 2260/046; B32B 2262/0269; B32B 2262/0276; B32B 2262/101; B32B 2262/106; B32B 2307/41; B32B 2307/7376; B32B 2605/18; B32B 5/263; B32B 5/024

See application file for complete search history.

(56) References Cited

U.S. PATENT DOCUMENTS 7,070,850 B2 7/2006 Dietz et al.
7,323,248 B2 1/2008 Ramsey
(Continued)

FOREIGN PATENT DOCUMENTS

CN 1191926 C 3/2005
CN 106221533 A 12/2016
(Continued)

OTHER PUBLICATIONS

Bedel, V., et al., "Innovative conductive polymer composite coating for aircrafts lightning strike protection", Journal of Applied Polymer Science, Nov. 15, 2019, pp. 1-13, vol. 137, issue No. 20.
(Continued)

*Primary Examiner* — Michael C Miggins
(74) *Attorney, Agent, or Firm* — COATS & BENNETT, PLLC

(57) ABSTRACT

Composite material protection from UV degradation is disclosed by providing a co-cured composite material substrate co-cured with a UV/visible light-resistant layer to form co-cured composite materials for exclusively imparting UV/visible light-resistant properties to co-cured composite material substrates for use in UV/visible light-resistant vehicle fuel tank assemblies.

21 Claims, 4 Drawing Sheets

(56)  References Cited

U.S. PATENT DOCUMENTS

| | | | |
|---|---|---|---|
| 8,158,245 | B2 | 4/2012 | Pratte et al. |
| 8,178,606 | B2 | 5/2012 | Sang et al. |
| 8,685,544 | B2 | 4/2014 | Larson-Smith et al. |
| 8,947,847 | B2 | 2/2015 | Langone et al. |
| 9,676,961 | B2 | 6/2017 | Sang et al. |
| 9,802,714 | B2 | 10/2017 | Gerken et al. |
| 9,912,137 | B2 | 3/2018 | Le et al. |
| 10,525,667 | B2 | 1/2020 | Hebert et al. |
| 10,906,211 | B2 | 2/2021 | Sang et al. |
| 11,752,708 | B2 | 9/2023 | Ackerman et al. |
| 2010/0151186 | A1 | 6/2010 | Hebert |
| 2012/0145319 | A1 | 6/2012 | Schaaf et al. |
| 2014/0141242 | A1 | 5/2014 | Phillips et al. |
| 2017/0043529 | A1 | 2/2017 | Sanderson |
| 2019/0210338 | A1 | 7/2019 | Childers et al. |
| 2019/0233946 | A1 | 8/2019 | Bruton et al. |
| 2020/0070998 | A1 | 3/2020 | Ayyadurai et al. |
| 2020/0165005 | A1 | 5/2020 | Christy et al. |
| 2020/0316823 | A1 | 10/2020 | Sang et al. |
| 2021/0008855 | A1 | 1/2021 | Sang et al. |
| 2021/0016319 | A1 | 1/2021 | Brie et al. |
| 2021/0016553 | A1 | 1/2021 | Brei et al. |
| 2021/0031942 | A1 | 2/2021 | Brei et al. |
| 2021/0060607 | A1 | 3/2021 | Brei et al. |
| 2021/0122891 | A1 | 4/2021 | Zhu et al. |
| 2021/0367416 | A1 | 11/2021 | Hebert |
| 2023/0080641 | A1 | 3/2023 | Ackerman et al. |

FOREIGN PATENT DOCUMENTS

| | | | |
|---|---|---|---|
| CN | 106366996 | A | 2/2017 |
| EP | 3397556 | A1 | 11/2018 |
| EP | 3036049 | B1 | 5/2019 |
| EP | 3766683 | A1 | 1/2021 |
| IN | 201911023774 | A | 12/2020 |
| JP | 2012240610 | A | 12/2012 |
| WO | 2021003047 | A1 | 1/2021 |
| WO | 2021037889 | A1 | 3/2021 |

OTHER PUBLICATIONS

Guo, Y., et al., "Implementation of fiberglass in carbon fiber composites as an isolation layer that enhances lightning strike protection", Composites Science and Technology, Feb. 23, 2019, pp. 117-124, vol. 174.

EP Search Report mailed Aug. 23, 2023 in re EP Application No. 22212766.4.

EP Search Report mailed Aug. 25, 2023 in re EP Application No. 22212768.0.

EP Search Report mailed Aug. 25, 2023 in re EP Application No. 22212773.0.

EP Search Report mailed Sep. 23, 2024 in re EP Application No. 24165716.2.

EP Search Report mailed Nov. 8, 2023 in re EP App No. 23186786.2.

200

102 — PROVIDE CO-CURABLE
COMPOSITE SUBSTRATE MATERIAL

104 — POSITION CO-CURABLE UV/VISIBLE
LIGHT-RESISTANT LAYER ONTO
CO-CURABLE COMPOSITE
SUBSTRATE MATERIAL

106 — CO-CURE COMPOSITE
MATERIAL, AND, UV/VISIBLE
LIGHT-RESISTANT LAYER TO FORM CO-CURED
UV-RESISTANT COMPOSITE MATERIAL
FUEL TANK ASSEMBLY

108 — PROVIDE FUEL TANK PRIMER
TO CO-CURED UV/VISIBLE
LIGHT-RESISTANT LAYER

CO-CURED UV/VISIBLE LIGHT-RESISTANT COATED COMPOSITE MATERIAL FOR AIRCRAFT WING FUEL TANK ASSEMBLY

CROSS-REFERENCE

This U.S. Non-Provisional Patent Application is a Continuation-in-Part of U.S. Ser. No. 17/708,207 filed Mar. 30, 2022, and issued Nov. 11, 2025 as U.S. Pat. No. 12,466,574, the entire contents of both of which are incorporated by reference herein.

TECHNOLOGICAL FIELD

The present disclosure relates generally to the field of composite materials, and composite materials used for manufacturing large structural components. More specifically, the present disclosure relates to the field of composite materials used for structural materials for interior and exterior surfaces of large structural aircraft components.

BACKGROUND

The use of composite materials in the manufacture of various structural component parts continues to increase. At least due to the strength-to-weight ratios, composite materials offer advantages as replacements for denser materials, such as, for example, metals, metal alloys, etc., where the overall weight of a completed structure (or the weight of a component part of a completed structure) is an important consideration in the selection of materials used in the manufacture of such a completed structure, or in the manufacture of a component of a completed structure.

Coating layers applied to composite materials are not as durable as, or have the longevity of, the composite materials to which such coating layers are applied. Composite material assemblies may otherwise comprise external or internal layers that can include, for example, protective coatings or other coating layers. For example, when composite materials are used in the fabrication of vehicles including, for example, aircraft, exterior paint coatings, referred to as an aircraft "livery", may require alteration, rework, change of logo, design, color scheme, etc., over the useful life of the vehicle. Such livery alteration, for example, may include the removal of one or more decorative coating layers applied onto a composite material, including, for example, one or more paint layers. However, the removal of one layer or layer type (paint, primer, adhesion promoting layer, adhesive layer, etc.) from materials stacked onto a composite material can require the removal of additional layers or layer types that then must be built back up, or otherwise reconstituted. In addition, livery alteration requiring paint removal via use of paint removal techniques can damage underlying layers, or even damage composite materials, if the composite materials are exposed to excessive mechanical paint removal techniques.

Unless explicitly identified as such, no statement herein is admitted as prior art merely by its inclusion in the Technological Field and/or Background section.

SUMMARY

According to present aspects, a co-curable composite material is disclosed, with the co-curable composite material comprising a co-curable composite structural material substrate and a co-curable UV/visible light-resistant coating layer, with the co-curable UV/visible light-resistant coating layer comprising at least one of fiberglass fibers, carbon fibers, polyester fibers, aramid fibers, boron fibers, quartz, and combinations thereof, with the co-curable UV/visible light-resistant coating layer in direct contact with the co-curable composite structural material substrate to form a co-curable/co-cured UV/visible light-resistant layer-coated composite material substrate, that can, for example, significantly impact composite material manufacture and improve the performance and reduce the weight of the composite structural material substrate by at least obviating the need to include separate UV/visible light-resistant coatings formerly applied to composite structural material substrates, such as, in the preparation of a composite material system used in structural assemblies for larger components, including internal and exterior surfaces of vehicles, including, for example, vehicles such as aircraft, and further including vehicle fuel tanks (e.g., aircraft fuel tanks) that can be located, for example, within an aircraft wing assembly.

According to present aspects, in the co-cured state, the co-cured UV/visible light-resistant layer-coated composite material substrate can be further configured to form a vehicle fuel tank. The vehicle fuel tank comprises a vehicle fuel tank inner surface, and a vehicle fuel tank cavity, with the vehicle fuel tank cavity defined by and otherwise surrounded by the vehicle fuel tank inner surface with the vehicle fuel tank inner surface exclusively comprising the co-curable UV/visible light-resistant coating layer, with the co-curable UV/visible light-resistant coating layer comprising at least one of fiberglass fibers, carbon fibers, polyester fibers, aramid fibers, boron fibers, quartz, and combinations thereof, wherein the co-curable UV/visible light-resistant coating layer has a UV/visible light transmittance value of 0% to about 20% for UV/visible wavelengths ranging from about 200 nm to about 800 nm when the co-curable UV/visible light-resistant coating layer comprises an average thickness ranging from about 2 mils to about 6 mils, and wherein said co-curable UV/visible light-resistant coating layer is configured to completely cover said co-curable composite material substrate.

In another aspect, said co-curable UV/visible light-resistant coating layer comprises fiberglass fibers.

In another aspect, the co-curable composite material substrate is co-curable with the co-curable UV/visible light-resistant coating layer at a temperature ranging from about 250° F. to about 410° F.

In another aspect, the co-curable composite material substrate comprises an epoxy resin-based matrix.

In a further aspect, the co-curable composite material substrate comprises a fiber reinforced epoxy resin-based matrix comprising at least one of carbon fibers, boron fibers, aramid fibers, fiberglass fibers, polyester fibers, and combinations thereof.

In another aspect, the co-curable composite material substrate comprises a carbon fiber reinforced polymer composite material.

In another aspect, the co-curable composite material substrate comprises at least one carbon fiber reinforced polymer prepreg.

According to another present aspect, a vehicle fuel tank is disclosed, with the vehicle fuel tank comprising a vehicle fuel tank assembly comprising a co-cured composite material, with the vehicle fuel tank assembly comprising a vehicle fuel tank inner surface. The vehicle fuel tank inner surface comprises a co-cured composite material substrate, a co-cured UV/visible light-resistant coating layer, with the co-cured UV/visible light-resistant coating layer comprising at least one of fiberglass fibers, carbon fibers, polyester fibers, aramid fibers, boron fibers, quartz, and combinations thereof, with the co-cured UV/visible light-resistant coating layer in direct contact with the co-cured composite material substrate, with the co-cured UV/visible light-resistant layer configured to completely cover the co-cured composite material substrate. The vehicle fuel tank further comprises a vehicle fuel tank cavity, with the vehicle fuel tank cavity defined by the vehicle fuel tank cavity inner surface. The co-cured composite material substrate and the co-cured UV-resistant coating layer are co-cured in a co-curing regimen to form the vehicle fuel tank assembly, said co-curing regimen comprising a co-curing temperature ranging from about 250° F. to about 410° F., and the co-cured UV/visible light-resistant layer has a UV/visible light transmittance value of 0% to about 20% for UV/visible wavelengths ranging from about 200 nm to about 800 nm when the co-curable and co-cured UV/visible light-resistant coating layer comprises an average thickness ranging from about 2 mils to about 6 mils.

In another aspect, said co-cured UV/visible light-resistant coating layer comprises fiberglass fibers.

In another aspect, the co-cured composite material substrate comprises an epoxy resin-based matrix.

In another aspect, the co-cured composite material substrate comprises a fiber reinforced epoxy resin-based matrix comprising at least one of carbon fibers, boron fibers, aramid fibers, fiberglass fibers, polyester fibers, and combinations thereof.

In a further aspect, the co-cured composite material substrate comprises a carbon fiber reinforced polymer composite material.

In another aspect, the co-cured composite material substrate comprises at least one carbon fiber reinforced polymer prepreg.

In a further aspect, the co-cured UV/visible light-resistant coating layer is configured to form the vehicle fuel tank cavity inner surface.

In a further aspect, the vehicle fuel tank inner surface further comprises a fuel tank primer layer disposed to cover the co-cured UV/visible light-resistant layer, said fuel tank cavity inner surface defined by the fuel tank primer layer.

In another aspect, inclusion of the said co-cured UV/visible light-resistant layer in the co-cured composite material assembly obviates the presence of at least one of a fuel tank primer layer and a UV-absorbing paint layer in the vehicle fuel tank assembly.

A further present aspect discloses an aircraft wing assembly comprising a vehicle fuel tank comprising a vehicle fuel tank assembly comprising a co-cured composite material, with the vehicle fuel tank assembly comprising a vehicle fuel tank inner surface. The vehicle fuel tank inner surface comprises a co-cured composite material substrate, a co-cured UV/visible light-resistant coating layer, with the co-curable UV/visible light-resistant coating layer comprising at least one of fiberglass fibers, carbon fibers, polyester fibers, aramid fibers, boron fibers, quartz, and combinations thereof, with the co-cured UV/visible light-resistant coating layer in direct contact with the co-cured composite material substrate, said co-cured UV/visible light-resistant coating layer configured to completely cover the co-cured composite material substrate. The vehicle fuel tank further comprises a vehicle fuel tank cavity, with the vehicle fuel tank cavity defined by the vehicle fuel tank cavity inner surface. The co-cured composite material substrate and the co-cured UV/visible light-resistant coating layer are co-cured in a co-curing regimen to form the vehicle fuel tank assembly, with the co-curing regimen comprising a co-curing temperature ranging from about 250° F. to about 410° F., and the co-cured UV/visible light-resistant layer has a UV/visible light transmittance value of 0% to about 20% for UV/visible light wavelengths ranging from about 200 nm to about 800 nm when the co-cured UV/visible light-resistant layer comprises an average thickness ranging from about 2 mils to about 6 mils.

In another aspect, a vehicle comprises a vehicle fuel tank comprising a vehicle fuel tank assembly comprising a co-cured composite material, with the vehicle fuel tank assembly comprising a vehicle fuel tank inner surface. The vehicle fuel tank inner surface comprises a co-cured composite material substrate, a co-cured UV/visible light-resistant layer, with the co-cured UV/visible light-resistant coating layer comprising at least one of fiberglass fibers, carbon fibers, polyester fibers, aramid fibers, boron fibers, quartz, and combinations thereof, with the co-cured UV/visible light-resistant layer in direct contact with the co-cured composite material substrate, with the co-cured UV/visible light-resistant layer configured to completely cover the co-cured composite material substrate. The vehicle fuel tank further comprises a vehicle fuel tank cavity, with the vehicle fuel tank cavity defined by the vehicle fuel tank cavity inner surface. The co-cured composite material substrate and the co-cured UV/visible light-resistant layer are co-cured in a co-curing regimen to form the vehicle fuel tank assembly, said co-curing regimen comprising a co-curing temperature ranging from about 250° F. to about 410° F., and the co-cured UV/visible light-resistant layer has a UV/visible light transmittance value of 0% to about 20% for UV/visible wavelengths ranging from about 200 nm to about 800 nm when the UV/visible light-resistant layer comprises an average thickness ranging from about 2 mils to about 6 mils, with the vehicle selected from the group consisting of a crewed aircraft, an uncrewed aircraft, a crewed spacecraft, an uncrewed spacecraft, a crewed rotorcraft, an uncrewed rotorcraft, a crewed terrestrial vehicle, an uncrewed terrestrial vehicle; a crewed surface water borne vehicle, an uncrewed waterborne vehicle, a crewed sub-surface water borne vehicle, an uncrewed sub-surface water borne vehicle, a satellite, and combinations thereof.

According to further present aspects, a method is disclosed, with the method comprising providing a co-curable composite material substrate, said composite material substrate comprising a co-curable composite material substrate first side and a co-curable composite material substrate second side. The method further comprises applying a co-curable UV/visible light-resistant layer onto said co-curable composite material substrate second side, with the co-curable UV/visible light-resistant coating layer comprising at least one of fiberglass fibers, carbon fibers, polyester fibers, aramid fibers, boron fibers, quartz, and combinations thereof, with the co-curable UV/visible light-resistant layer applied onto the composite material substrate second side at an average thickness ranging from about 2 mils to about 6 mils and co-curing the co-curable composite material substrate with the co-curable UV/visible light-resistant layer to form a co-cured composite material vehicle fuel tank assembly, with the co-cured composite material vehicle fuel tank assembly comprising a co-cured vehicle fuel tank assembly inner surface, and with the co-cured composite material vehicle fuel tank assembly inner surface comprising a co-cured UV/visible light-resistant layer having a UV/visible light transmittance value of 0% to about 20% for UV/visible wavelengths ranging from about 200 nm to about 800 nm when the co-cured UV/visible light-resistant layer comprises an average thickness ranging from about 2 mils to about 6 mils, and with the co-cured UV/visible light-resistant layer configured to define a vehicle fuel tank cavity. According to the disclosed methods, including the co-cured UV/visible light-resistant layer in the co-cured composite material vehicle fuel tank assembly obviates the need for the presence of at least one of a UV/visible light-absorbing detail primer layer and a UV/visible light-absorbing paint layer in the co-cured composite material vehicle fuel tank assembly.

In another aspect, the co-cured composite material substrate comprises a fiber reinforced epoxy resin-based matrix comprising at least one of carbon fibers, boron fibers, aramid fibers, fiberglass fibers, polyester fibers, and combinations thereof.

In a further aspect, the co-cured composite material substrate comprises a carbon fiber reinforced polymer composite material.

In another aspect, the method further comprises depositing a fuel tank primer layer on the UV/visible light-resistant layer.

The features, functions and advantages that have been discussed can be achieved independently in various aspects or may be combined in yet other aspects, further details of which can be seen with reference to the following description and the drawings.

BRIEF DESCRIPTION OF THE DRAWINGS

Figure 1A:
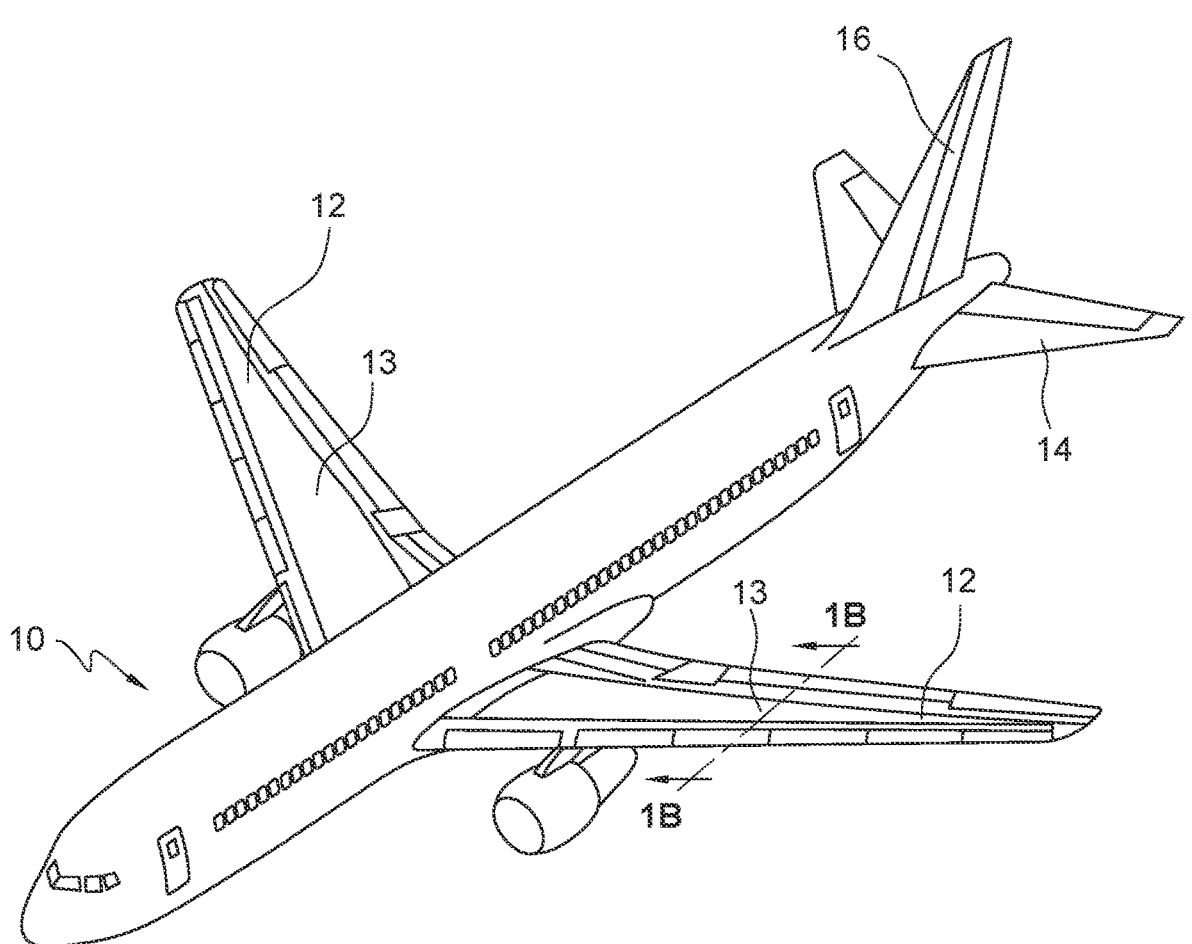
Figure 1B:
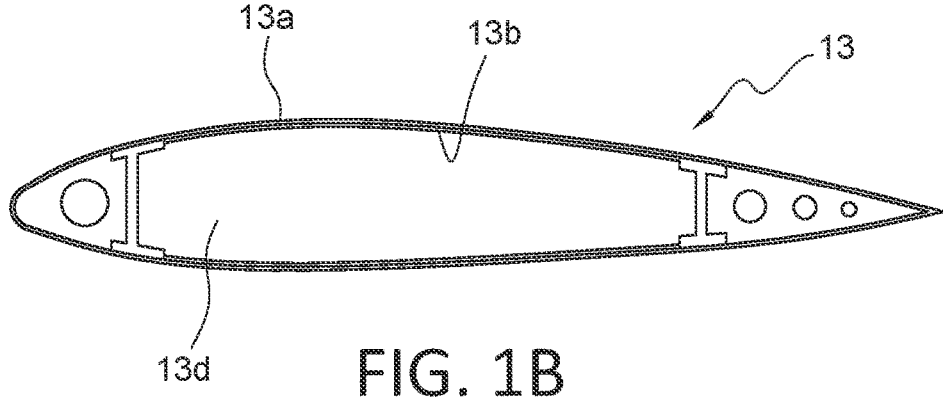
Figure 2A:
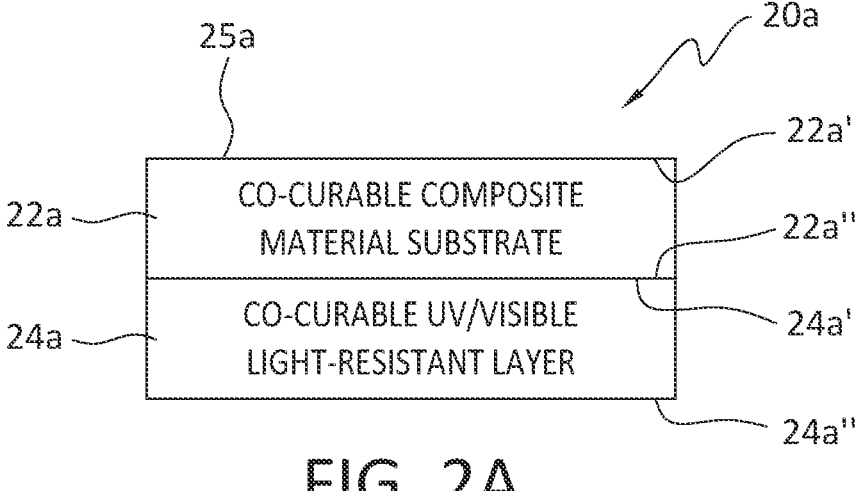
Figure 2B:
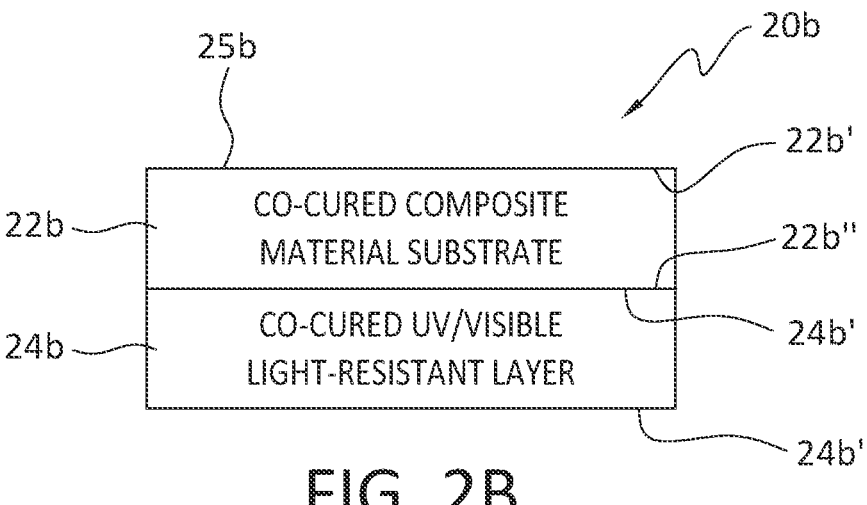
Figure 2C:
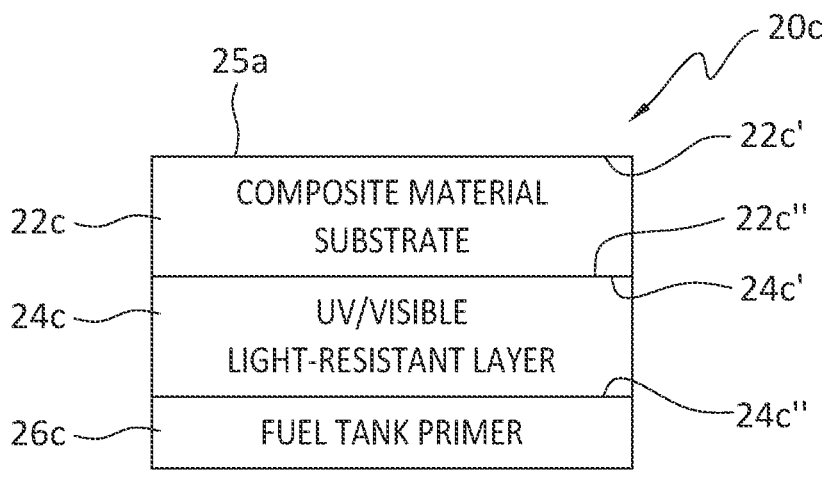
Figure 3:
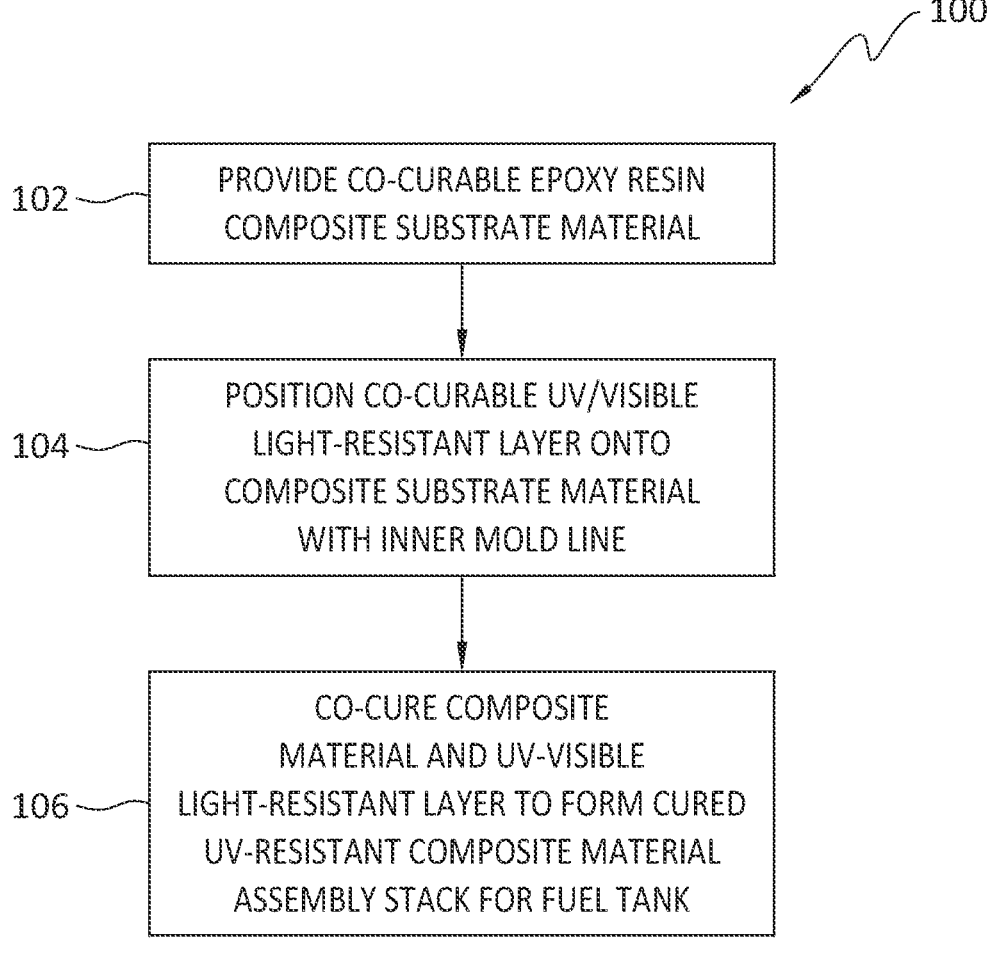

Having thus described variations of the disclosure in general terms, reference will now be made to the accompanying drawings, which are not necessarily drawn to scale, and wherein:

FIG. 1A is an illustration of a vehicle in the form of an aircraft, according to present aspects;

FIG. 1B is a cross-sectional side view of a vehicle fuel tank in the form of an aircraft wing assembly fuel tank;

FIG. 2A is an enlarged cross-sectional representative side view of a UV/visible light-resistant co-curable composite material, according to present aspects;

FIG. 2B is an enlarged cross-sectional representative side view of a UV/visible light-resistant cured composite material, according to present aspects;

FIG. 2C is an enlarged cross-sectional representative side view of a UV/visible light-resistant cured composite material system, according to present aspects;

FIG. 3 is a flowchart outlining a method, according to present aspects; and

Figure 4:
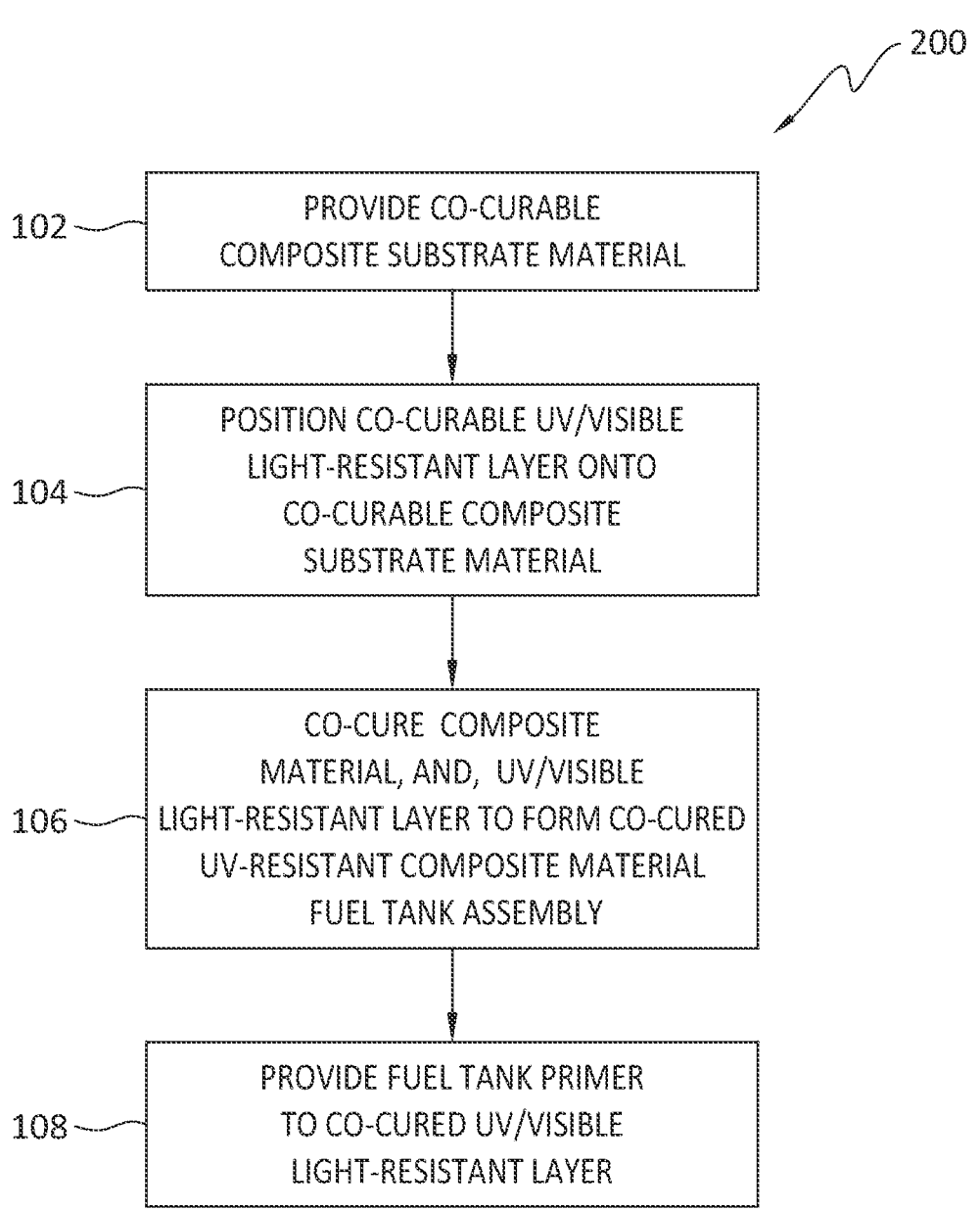

FIG. 4 is a flowchart outlining a method, according to present aspects.

DETAILED DESCRIPTION

Material layers that can be applied as, for example, coatings can be added to a composite material surface for the purpose of changing the surface characteristics of a composite material. For example, primers or other coating layers can be added to a composite material to improve adhesion of subsequent coating layers such as, for example, paints, topcoats, etc., to a composite material surface that may already have one or more other coatings applied. The layering of coating materials onto composite material surfaces is labor intensive, time-consuming and can add substantial weight to large objects and large structures that include such composite materials having multiple coating layers.

In addition, paint removal processes that remove various paint coating layers from composite materials often damage protective surfacing layers applied to composite materials and that are applied beneath paint coating layers can require significant resurfacing once the paint layers are stripped from the surfacing layers. For example, one or more of the composite material coating layers can each require separate surfacing preparation steps and procedures prior to the subsequent deposition of one or more coating layers onto composite material surfaces. In some instances, a portion of one or more previously deposited coating must be removed, or otherwise reworked, before adding further coating layers. Such intermediate reworking of composite material surfaces during the treatment of composite material surfaces is also labor-intensive, time-consuming, and costly.

During the fabrication of composite material parts that can include for example, an epoxy resin-based composite material, a carbon fiber reinforced polymer material, etc., composite material surfaces can begin to degrade at the composite material surface due to exposure to ambient ultraviolet/visible light (UV/visible light) radiation. To avoid a change in outer surface characteristic of a composite material outer surface that can be caused, at least in part, by composite material exposure to UV/visible light radiation, composite material surfaces are often coated with at least one protective layer such as, for example, a spray applied surfacer, a primer layer, etc., with the protective layer containing, for example, a UV "blocking" agent.

Such UV blocking agent layers are not typically disposed on assembly inner surfaces where an inner mold line may define the composite material inner surface profile. Since UV/visible light degradation of composite materials can also occur on an inner surface of a composite material substrate assembly (e.g., where an inner mold line, or IML can reside), present aspects contemplate treating such "inner" surfaces of composite material assemblies such as, for example, vehicle fuel tank cavities housed within a vehicle fuel tank.

Applying UV mitigation, or "blocking" agents in layers to composite surfaces often adds manufacturing complexity in the form of, at least, increasing manufacturing time, increasing rework time, increasing overall production cost, etc., as such applied UV-blocking material coverings typically are removed from the composite material or reactivated chemically or mechanically before additional composite material assembly processing is conducted. In addition, primer and surfacing film layers are often treated to accommodate a subsequent paint layer or topcoat. This treatment of individual subsequent layers added to a composite material system (that can be a composite material layered "stack") again leads to increased manufacturing time, increased rework time, increased overall production cost, etc.

Composite materials are typically post-processed or "reworked", for example, to re-paint and/or resurface composite materials. For example, primers and paint coatings that include a UV mitigation, or a UV "blocking" agent can be applied to a composite material surface for the purpose of protecting a composite material surface from degradation and/or discoloration that can be caused, for example, by exposing the composite material to UV/visible light radiation during the use of the composite material as a construction material in the manufacture of, for example, a larger structure.

In addition, UV/visible light damage from UV/visible light wavelengths impacting coating layers used to coat composite materials and/or impacting underlying composite materials during aircraft manufacture and aircraft use can cause a composite material to require material rework. Exposure to UV/visible light radiation can alter a material's characteristic over time. For example, UV/visible light radiation can render a coating layer or composite material vulnerable to processing damage, such as, for example, when a layer or composite material is exposed to, for example, a mechanical paint removal technique. Material layer selection for large structures to guard against environ- mental damage, including UV/visible light damage, can result in a required application of a series of coating layers, with each such coating layer application resulting in a significant amount of time, expense, and resulting added weight to large structures including, for example, aircraft (where weight considerations can further impact fuel usage, cargo and passenger capacity, aircraft range, etc.).

Present aspects are disclosed that are directed to co- curable and co-cured composite materials comprising a co-curable or co-cured layer of UV/visible light-resistant layer immediately contacting the composite material sub- strate. The co-curable or co-cured UV/visible light-resistant coating layer comprises at least one of fiberglass fibers, carbon fibers, polyester fibers, aramid fibers, boron fibers, quartz, and combinations thereof, The incorporation into the composite material substrate of the co-cured and co-curable UV/visible light-resistant layer significantly impacts com- posite material manufacture and improves the performance and reduces the weight of the structural composite material by at least obviating the need to include separate UV- resistant coatings formerly applied to composite material substrates, such as for the protection of composite materials from UV/visible light damage, and for example, in the preparation of a composite material system used in structural assemblies for larger components, including internal and exterior surfaces of vehicles, including, for example, air- craft.

According to present aspects, methods for improving the UV/visible light protection and reducing UV/visible light degradation of composite material substrate surfaces are presently disclosed, as well as composite material substrates having improved UV/visible light protection without the previously required presence of typically applied protective coverings or layers of UV/visible light-resistant primers or separate layers of, for example, UV-absorbing paint(s). In addition to preventing UV/visible light degradation of underlying composite material substrate surfaces, presently disclosed methods, systems, and apparatuses eliminate the need for protective coverings, protective primer layers, UV-absorbing paint layers, with the result being a reduction in a composite material system complexity and overall composite material layered stack weight that further reduces composite material processing time. The reduction in com- posite material UV/visible light degradation further decreases the occurrence of the need for composite material rework (required by such UV/visible light degradation).

FIG. 1A is an illustration of a vehicle in the form of an aircraft, according to present aspects. As shown in FIG. 1, aircraft 10 includes wing assemblies 12, horizontal stabilizer assemblies 14, and vertical stabilizer assembly 16 with the presently disclosed composite materials configured to form and otherwise be configured to form various aircraft assem- blies including those shown in FIG. 1A. As further shown in FIG. 1A aircraft wing assemblies 12 comprise vehicle fuel tanks in the form of aircraft fuel tanks within the wing assemblies (referred to herein as aircraft wing assembly fuel tanks), with FIG. 1B showing a cross-sectional side view into wing assembly 13 along line 1B-1B. As shown in FIG. 1B, aircraft wing assembly fuel tank 13 comprises a wing assembly fuel tank outer surface 13a and a wing assembly fuel tank inner surface 13b. FIG. 1B further shows a wing assembly fuel tank cavity 13d, with the wing assembly fuel tank cavity 13d defined by (e.g. surrounded by, bounded by) the aircraft wing assembly fuel tank inner surface 13b.

According to present aspects a composite material sub- strate is provided that can comprise an epoxy resin-based composite material in combination with a fiber in a matrix that can include carbon fibers, boron, fibers, aramid fibers, fiberglass fibers, polyester fibers, and combinations thereof, with carbon fibers being particularly preferred, and with a carbon fiber reinforced polymer composite material being particularly preferred as a composite material substrate.

According to further presently disclosed aspects, a com- posite material for use in the manufacture of a composite material structure further includes a co-curable UV/visible light-resistant layer (equivalently referred to herein as a UV/visible light-inhibiting layer) with the UV/visible light- resistant layer provided to the composite material exclu- sively in the form of a co-curable UV/visible light-resistant layer that can be, for example, a single co-curable UV/vis- ible light-resistant layer ply (for example, in the form of a single ply film layer) as the co-curable UV/visible light- resistant layer. According to further present aspects, the co-curable UV/visible light-resistant coating layer com- prises at least one of fiberglass fibers, carbon fibers, poly- ester fibers, aramid fibers, boron fibers, quartz, and combi- nations thereof. According to further present aspects, the co-curable UV/visible light-resistant layer is provided in intimate contact with the co-curable composite material substrate material, with the composite material substrate being co-curable with the co-curable UV/visible light-resis- tant layer to form a co-cured UV/visible light-resistant coated composite material substrate.

According to present aspects, a "co-curable" material is defined as a material that can be co-cured with another material such that the two co-curable materials will co-cure when exposed to common curing conditions, such as those that can be imposed by a predetermined curing regimen (predetermined temperature, pressure, ramp up tempera- tures/rates, dwell periods, etc.) to form a "co-cured" com- position.

The composite material substrate, also referred to equiva- lently herein as the "base layer", or the "underlayer", or the "composite material substrate layer" can be a co-curable composite material that can be an epoxy resin-based mate- rial, and that can include fiber reinforced polymer composite materials that can have an epoxy resin-based matrix, and that can include carbon fiber reinforced polymer composite materials. In present aspects, the co-curable composite mate- rial can be any suitable composite material that can be co-cured with a co-curable layer material at a co-curing temperature ranging from about 250° F. to about 410° F.

Composite materials are often layered into laminates that have a selected number of composite material layers, often called "prepregs". Prepregs can be "pre-impregnated" com- posite fibers where a matrix material, such as an epoxy resin-based material, is already present. The fibers often take the form of a weave, and the matrix is used to bond them together and to other components during manufacture. The composite matrix material is typically partially cured to allow easy handling. Such composite matrix material may require cooled or cold storage to prevent further partial curing, or complete curing, and such composite matrix material is referred to as B-Stage material. Consequently, B-Stage prepregs are stored in cooled or cold storage areas, as ambient heat can accelerate complete polymerization. Prepregs also allow one to impregnate a bulk amount of fiber and then store the prepreg in a cooled or cold storage area for an extended time until a later cure. Prepregs pleas may be applied to tools which are flat or contoured depending upon the fabrication process used. Multiple layers of prepreg plies are used to make a desired shape using shaping or forming tools, also called mandrels. Present aspects contemplate, but are not limited to, the use of laid up layers of composite material prepregs to form the co-curable and co-cured composite material substrate.

According to present aspects, a selected degree of UV/visible light-resistance and UV/visible light-protection can be exclusively imparted to the co-cured composite material substrate by immediately contacting a co-curable composite material substrate surface with a co-curable UV/visible light-resistant layer that, after co-curing the two materials, forms a co-cured UV/visible light-resistant coated composite material. That is, according to present aspects, previously required UV/visible light-resistant primers, UV-blocking paints, etc., can be eliminated and their presence is otherwise obviated as the UV protection function within a UV/visible light-resistant composite material is exclusively satisfied by the addition and placement of a co-curable UV/visible light-resistant layer that is provided in immediate contact with the co-curable composite material substrate.

According to present aspects, by co-curing the co-curable UV/visible light-resistant layer with the co-curable composite material, advantages (including UV-protection) are exclusively imparted by the presently disclosed co-cured UV/visible light-resistant layer at least to the underlying co-cured composite material substrate that can be a co-cured epoxy-based composite material and can further be a co-cured carbon fiber reinforced polymer substrate material substrate. No further UV-protective layers (e.g., in the form of UV/visible light-resistant primers, UV/visible light-resistant paints, etc.) are contemplated or are otherwise required to be included in the co-cured composite materials of the present disclosure to impart a selected degree of complete UV protection to the presently disclosed co-cured UV/visible light-resistant layer-coated composite materials. According to present aspects, such imparted advantages include, without limitation, the UV/visible light protection of the "underlying" composite material substrate (that can be an epoxy resin-based composite material), and the protection of composite material substrate from deleterious effects of mechanical paint removal techniques, etc.

In addition, the robustness of the presently disclosed co-curable UV/visible light-resistant layer that is co-cured onto, for example, a co-curable composite material substrate that can be an epoxy-based composite material substrate can endure subsequent and repeated heat treatments that may be required during subsequent and repeated repainting protocols. That is, unlike some currently required repainting protocols, the presently described co-cured UV/visible light-resistant layer need not be replaced, removed, or otherwise reapplied during reworking, paint stripping, repainting, repeated heat treatments, etc. Accordingly, present aspects further contemplate the removal or reconditioning of only the layers coated atop the present co-cured UV/visible light-resistant layer (e.g., topcoat layers, basecoat layers, clearcoat layers, intermediate coating layers, etc.). In this way, present aspects disclose the protection of the composite material from the deleterious effect that would otherwise occur when a composite material surface is exposed to UV/visible light radiation.

Through the use of the presently disclosed co-cured UV/visible light-resistant coated composite material substrate, a significant number of procedural steps that are otherwise, and have previously been, required during re-painting or reworking a composite material substrate are obviated; resulting in a substantial reduction in resources including, for example, material cost for reworking and/or replacing UV/visible light-damaged layers, manpower hours previously required for individual layer application treatment (e.g., individual layer pre-treatment surfacing steps, layer application steps, layer post-treatment surfacing steps (including chemical application, physical surfacing treatments such as, including sanding, etc.), inspection of deposited layers, etc.).

According to present aspects, FIG. 2A shows an enlarged cross-sectional representative side view of a co-curable composite material assembly 20a consisting of a co-curable composite material substrate 22a (having a co-curable composite material substrate first side 22a' and a composite material substrate second side 22a") with a co-curable UV/visible light-resistant layer 24a disposed onto the co-curable composite material 22a, (with the co-curable UV/visible light-resistant layer 24a having a co-curable UV/visible light-resistant layer first side 24a' and a co-curable UV/visible light-resistant layer second side 24a"). According to present aspects the co-curable composite assembly 20a can be co-cured to form a co-cured composite material assembly. The co-curable composite material 20a can be subjected to a co-curing regimen where the co-curable UV/visible light-resistant layer 24a disposed onto the co-curable composite material substrate 22a are together co-cured at a curing temperature less than 400° F., and more preferably at a temperature ranging from about 250° F. to about 410° F. for a suitable duration to co-cure the two components to form a co-cured UV/visible light-resistant composite material assembly.

As shown in FIG. 2A, the co-curable composite material substrate 22a can be a co-curable epoxy-resin-based composite material, and further can be a co-curable carbon fiber reinforced polymer composite material substrate, with the composite material substrate assembly able to be used to form structural composite materials for the manufacture of structural components and structural component assemblies of vehicles including, for example, the aircraft wing assembly fuel tank of the type represented, for example, in FIG. 1B, and that can be of the type of fuel tank that can be installed into the vehicle shown in the form of an aircraft illustrated in FIG. 1A.

FIG. 2B shows a representative enlarged cross-sectional side view of a co-cured UV/visible light-resistant composite material assembly 20b that is formed from the uncured and co-curable components shown in FIG. 2A, and that, in the cured state as shown in FIG. 2B, includes a co-cured UV/visible light-resistant layer 24b (with the co-curable UV/visible light-resistant layer 24a (having a co-curable UV/visible light-resistant layer first side 24b' and a co-curable UV/visible light-resistant layer second side 24b") that is co-cured with the co-cured composite material substrate 22b (having a co-curable composite material substrate first side 22b' and a composite material substrate second side 22b"). According to present aspects, the co-cured UV/visible light-resistant layer 24b can be a single ply, or can be more than one ply, with the co-cured UV/visible light-resistant layer 24b able to exclusively impart (i.e., is essentially 100% responsible for imparting) a selected degree of UV/visible light protection to the underlying co-cured composite material substrate 22b such that the co-cured UV/visible light-resistant layer has a UV/visible light transmittance value ranging from about 0% to about 20% UV/visible light transmittance for UV/visible wavelengths ranging from about 200 nm to about 800 nm when the co-cured UV/visible light-resistant layer comprises an average thickness ranging from about 2 mils to about 6 mils According to present aspects, the co-cured UV/visible light-resistant composite material assembly 20b, as shown in FIG. 2B, can be used as a structural component that includes an interior surface of, for example, an aircraft wing assembly fuel tank. When the presently disclosed composite materials are used to form an interior structure (e.g., a fuel tank cavity, etc.) during formation of the composite material substrate, it is understood that an inner mold line (IML) 25a, 25b can be transferred to the co-curable and the co-cured composite material substrate from, for example, a composite material forming tool or forming surface (e.g., a mandrel, etc.). Such inner mold line is transferred to and otherwise present on the co-cured UV/visible light-resistant layer 24b, with the IML located on the interior surface of a structure, such as, for example, the wing assembly fuel tank inner surface 13b of the aircraft wing assembly 13 as shown, for example, in FIG. 1B.

According to present aspects, the UV/visible light-resistant layer is selected to have a UV/visible light resistance characteristic and value such that the co-cured UV/visible light-resistant layer alone is solely responsible for imparting the selected degree of UV/visible light-resistance and UV/visible light protection to the underlying epoxy resin-based composite material. That is, according to present aspects, the UV/visible light blocking capabilities of the presently disclosed co-cured UV/visible light-resistant layer eliminate the need for, render redundant, and otherwise obviate the presence of any additional UV/visible light-resistant layer in the presently disclosed composite material systems, as well as obviating the need for incorporating UV/visible light blocking agents into the composite material substrate. Instead, the entire UV/visible light-blocking function for the presently disclosed co-cured composite material assemblies, and structures incorporating the presently disclosed co-cured composite material assemblies, is completely satisfied by the UV/visible light-blocking capabilities introduced to the resulting cured composite material assembly by the UV/visible light-resistant layer, that can be, for example, a single ply UV/visible light-resistant layer. Such redundant, obviated, and/or eliminated layer(s) include, for example, UV/visible light-resistant paints, UV/visible light-resistant primers, UV/visible light-resistant topcoats. Again, according to present aspects, no additional UV/visible light-resistant layers are present in the disclosed co-cured composite materials or are needed to achieve the desired and selected UV/visible light-blocking function present within the presently disclosed co-cured composite material assemblies.

According to present aspects, as shown in FIG. 2B, the co-cured composite material substrate 22a can be a co-cured epoxy-resin-based composite material, and further can be a co-cured carbon fiber reinforced polymer composite material substrate, with the co-cured composite material substrate assembly configured to form structural composite materials for the manufacture of structural components and structural component assemblies of vehicles including, for example, the aircraft wing assembly fuel tanks of the type represented, for example, in FIG. 1B, and that can be of the type of fuel tank that can be installed into the vehicle shown in the form of an aircraft illustrated in FIG. 1A.

According to present aspects, when configured as various aircraft structural composite materials, the co-cured UV/visible light-resistant composite material assemblies 20b of the type shown in FIG. 2B can be configured to accept and otherwise facilitate the deposition of various primer and topcoat layers that can either become a part of, or precede the formation of an interior of a vehicle fuel tank such as, for example, the interior (e.g., the interior cavity wall or cavity boundary, etc.) of a large structural assembly such as, for example, a vehicle fuel tank that can be, for example, an aircraft wing assembly fuel tank of the type shown in FIG. 1B, with the aircraft wing assembly fuel tank of the type that can be installed to reside within the aircraft wing assembly of the aircraft as shown in FIG. 1A.

FIG. 2C is an enlarged cross-sectional representative side view of a co-cured UV/visible light-resistant composite material assembly 20c in the form of a co-cured composite material system that further includes the co-cured UV/visible light-resistant composite material assembly layers shown in FIG. 2B (as assembly 20b). That is, FIG. 2C shows a co-cured composite material substrate 22c with the co-cured UV/visible light-resistant layer 24c applied and disposed onto the co-cured epoxy resin composite material substrate 22c. As further shown in FIG. 2C, and according to present aspects, the co-cured UV/visible light-resistant composite material assembly does not contain any further UV/visible light-resistant material (e.g., in the form of UV/visible light-resistant primer layer(s) or UV/visible light-resistant paint layer(s), etc.). That is, as shown in FIG. 2C, and according to present aspects, the UV/visible light-resistant layer 24c is solely responsible for imparting UV/visible light-resistance to the UV/visible light-resistant composite material assembly 20c (e.g., inhibiting UV/visible light radiation from passing through the co-cured UV/visible light-resistant layer to the underlying co-cured composite material substrate). As shown in FIGS. 2B and 2C, the co-cured composite material substrate can be a co-cured carbon fiber reinforced polymer composite material substrate and can further be a co-cured epoxy resin-based composite material substrate.

The co-cured UV/visible light-resistant composite material assembly 20c as shown in FIG. 2C further comprises a fuel tank primer layer 26c, covering the co-cured UV/visible light-resistant layer 24c. According to present aspects, the average thickness of the fuel tank primer, if desired, can be greatly reduced from the amount and layer thickness of conventional fuel tank primer layers previously required for known composite material assemblies. More specifically, the present co-cured UV/visible light-resistant composite material assemblies comprising the UV/visible light-resistant layer can facilitate reducing the thickness of, or eliminating the need for a fuel tank primer layer. Such reduction in thickness (equivalently referred to herein as "primer coating layer thickness"), or elimination of the fuel tank primer can result in a significant weight reduction, cost reduction, processing time reduction, rework time reduction, man/hour labor reduction, and required material reduction due to the scale of a large structure having large structure assemblies including, for example, an aircraft wing assembly fuel tank.

Further present aspects contemplate co-curable composite materials and co-cured composite materials, assemblies comprising the co-cured composite materials, sub-assemblies comprising the co-cured composite materials, and structures comprising at least one of the assemblies and/or sub-assemblies comprising the co-cured UV/visible light-resistant composite materials that are made according to the methods set forth herein, including, for example, crewed aircraft, an uncrewed aircraft, a crewed spacecraft, an uncrewed spacecraft, a crewed rotorcraft, an uncrewed rotorcraft, a crewed terrestrial vehicle, an uncrewed terrestrial vehicle, a crewed surface water borne vehicle, an uncrewed waterborne vehicle, a crewed sub-surface water borne vehicle, an uncrewed sub-surface water borne vehicle, a satellite, and combinations thereof.

FIGS. 3 and 4 are flowcharts outlining methods for making the presently disclosed co-curable and co-cured composite materials. As shown in FIG. 3, method 100 is outlined, with method 100 comprising providing 102 a co-curable composite material substrate that can be a co-curable epoxy resin-based fiber reinforced composite material substrate, and can further be a co-curable carbon fiber reinforced polymer material substrate. Method 100 further comprises positioning 104 a co-curable UV/visible light-resistant layer onto the co-curable composite material layer, with the composite material substrate having an inner mold line. The composite material substrate can be a co-curable epoxy resin-based composite substrate material and can further be a carbon fiber reinforced polymer composite material. The co-curable UV/visible light-resistant layer comprises at least one of fiberglass fibers, carbon fibers, polyester fibers, aramid fibers, boron fibers, quartz, and combinations thereof. According to present aspects, the co-curable UV/visible light-resistant layer can be a single layer ply, or can be a plurality of layer plies such that the co-curable UV/visible light-resistant layer has a UV/visible light transmittance value ranging from about 0% to about 20% UV/visible light transmittance for UV/visible wavelengths ranging from about 200 nm to about 800 nm when the UV/visible light-resistant layer comprises an average thickness ranging from about 2 mils to about 6 mils. The co-curable UV/visible light-resistant composite material assembly comprising the co-curable UV/visible light-resistant layer can be of the type shown and described at least in FIG. 2A and described herein. Method 100 further comprises co-curing 106 the co-curable composite material substrate with the co-curable UV-resistant layer at a temperature ranging from about 250° F. to about 410° F. to form a co-cured UV/visible light-resistant composite material fuel tank assembly of the type shown in FIG. 1B and further described herein. Method 100 further contemplates the formation of a co-cured UV/visible light-resistant composite material assembly of the type shown and described at least in FIGS. 2B and 2C and described herein.

FIG. 4 is a flowchart outlining a method, according to present aspects. As shown in FIG. 4, method 200 comprises providing 102 a co-curable composite material substrate that can be a co-curable epoxy resin-based fiber reinforced composite material substrate, and that can further be a co-curable carbon fiber reinforced polymer material substrate. Method 200 further comprises applying and positioning 104 a co-curable UV/visible light-resistant layer comprising at least one of fiberglass fibers, carbon fibers, polyester fibers, aramid fibers, boron fibers, quartz, and combinations thereof, onto the co-curable composite material layer, with the composite material substrate having an inner mold line. According to present aspects, the co-curable UV/visible light-resistant layer can be a single ply, and can be a single ply or a plurality of plies such that the co-curable UV/visible light-resistant layer has a UV/visible light transmittance value ranging from about 0% to about 20% UV/visible light transmittance for UV/visible wavelengths ranging from about 200 nm to about 800 nm when the UV/visible light-resistant layer comprises an average thickness ranging from about 2 mils to about 6 mils. The co-curable UV/visible light-resistant composite material assembly comprising the UV/visible light-resistant layer can be of the type shown and described at least in FIGS. 2A, and further described herein. Method 200 further comprises co-curing 106 the co-curable composite material layer with the co-curable UV-resistant layer at a temperature ranging from about 250° F. to about 410° F. to form a co-cured UV/visible light-resistant composite material fuel tank assembly of the type shown in FIG. 1B and further described herein. Method 200, according to present aspects, further comprises providing 108 a fuel tank primer to the co-cured UV/visible light-resistant layer to form, for example, a co-cured composite material assembly of the type shown in FIG. 2C, with the co-cured composite material assembly configured to form the aircraft wing assembly fuel tank of the type shown, for example, in FIG. 1B.

The present aspects may, of course, be carried out in other ways than those specifically set forth herein without departing from essential characteristics of the present disclosure. The present aspects are to be considered in all respects as illustrative and not restrictive, and all changes coming within the meaning and equivalency range of the appended claims are intended to be embraced therein.

What is claimed is:

1. A co-curable composite material assembly for a vehicle fuel tank assembly, the co-curable composite material assembly comprising:

a co-curable UV/visible light-resistant composite material substrate assembly consisting of:

a co-curable epoxy resin-based composite material substrate, said co-curable epoxy resin-based composite material substrate comprising a co-curable epoxy resin-based composite material substrate first side and a co-curable epoxy resin-based composite material substrate second side;

a co-curable UV/visible light-resistant coating layer, said co-curable UV/visible light-resistant coating layer comprising a co-curable UV/visible light-resistant coating layer first side and a co-curable UV/visible light-resistant coating layer second side, only said co-curable UV/visible light-resistant coating layer configured to be in immediate contact with at least one of said co-curable epoxy resin-based composite material substrate first side and said co-curable epoxy resin-based composite material substrate second side, said co-curable epoxy resin-based composite material substrate in combination with the co-curable UV/visible light-resistant coating layer configured to form a co-curable UV/visible light-resistant layer-coated composite material substrate assembly, said co-curable UV/visible light-resistant coating layer exclusively imparting 100% of a degree of UV/visible light protection imparted to the co-curable UV/visible light-resistant composite material substrate assembly, said co-curable UV/visible light-resistant coating layer comprising at least one of fiberglass fibers, carbon fibers, polyester fibers, aramid fibers, boron fibers, quartz, and combinations thereof, said co-curable UV/visible light-resistant layer-coated composite material substrate assembly configured to form a co-cured vehicle fuel tank assembly in a co-cured state, said co-cured vehicle fuel tank assembly comprising:

a vehicle fuel tank inner surface;

a vehicle fuel tank cavity, said vehicle fuel tank cavity defined by the vehicle fuel tank inner surface;

wherein said co-curable UV/visible light-resistant coating layer has a UV/visible light transmittance value of 0% to about 20% for UV/visible light wavelengths ranging from about 200 nm to about 800 nm when the co-curable UV/visible light-resistant coating layer comprises an average thickness ranging from about 2 mils to about 6 mils;

wherein said co-curable UV/visible light-resistant coating layer is configured to completely cover said co-curable epoxy resin-based composite material substrate;

wherein the co-cured UV/visible light-resistant coating layer alone is solely responsible for imparting the selected degree of UV/visible light-resistance and UV/visible light protection to the underlying co-curable epoxy resin-based composite material substrate; and wherein inclusion of the co-curable UV/visible light-resistant coating layer in the co-cured state in a co-cured vehicle fuel tank assembly obviates the need for the presence of at least one of a UV/visible light-absorbing detail primer layer and a UV/visible light-absorbing paint layer in the co-cured vehicle fuel tank assembly.

2. The co-curable composite material assembly of claim 1, wherein the co-curable epoxy resin-based composite material substrate is co-curable with the co-curable UV/visible light-resistant coating layer at a temperature ranging from about 250° F. to about 410° F.

3. The co-curable composite material assembly of claim 1, wherein the co-curable epoxy resin-based composite material substrate comprises an epoxy resin-based matrix.

4. The co-curable composite material assembly of claim 1, wherein the co-curable epoxy resin-based composite material substrate comprises a fiber reinforced epoxy resin-based matrix comprising at least one of carbon fibers, boron fibers, aramid fibers, fiberglass fibers, polyester fibers, and combinations thereof.

5. The co-curable composite material assembly of claim 1, wherein the co-curable epoxy resin-based composite material substrate comprises a carbon fiber reinforced polymer composite material.

6. The co-curable composite material assembly of claim 1, wherein the co-curable epoxy resin-based composite material substrate comprises at least one carbon fiber reinforced polymer prepreg.

7. A co-cured UV/visible light-resistant vehicle fuel tank assembly comprising:

a co-cured UV/visible light-resistant composite material assembly consisting of:

a co-cured epoxy resin-based composite material substrate, said co-cured UV/visible light-resistant vehicle fuel tank assembly further comprising a vehicle fuel tank inner surface, said vehicle fuel tank inner surface comprising:

a co-cured UV/visible light-resistant layer, said co-cured UV/visible light-resistant coating layer comprising at least one of fiberglass fibers, carbon fibers, polyester fibers, aramid fibers, boron fibers, quartz, and combinations thereof, said co-cured UV/visible light-resistant layer in direct contact with the co-cured epoxy resin-based composite material substrate, said co-cured UV/visible light-resistant layer configured to completely cover the co-cured composite material substrate;

a vehicle fuel tank cavity, said vehicle fuel tank cavity defined by the vehicle fuel tank inner surface;

wherein the co-cured epoxy resin-based composite material substrate and the co-cured UV-resistant coating layer are co-cured in a co-curing regimen to form the co-cured UV/visible light-resistant vehicle fuel tank assembly, said co-curing regimen comprising a co-curing temperature ranging from about 250° F. to about 410° F.;

wherein the co-cured UV/visible light-resistant coating layer has a UV/visible light transmittance value of 0% to about 20% for UV/visible light wavelengths ranging from about 200 nm to about 800 nm when the co-cured UV/visible light-resistant coating layer comprises an average thickness ranging from about 2 mils to about 6 mils;

wherein the co-cured UV/visible light-resistant coating layer alone is solely responsible for imparting the selected degree of UV/visible light-resistance and UV/visible light protection to the underlying co-cured epoxy resin-based composite material; and wherein inclusion of the co-cured UV/visible light-resistant coating layer in the co-cured UV/visible light-resistant vehicle fuel tank assembly obviates the need for the presence of at least one of a UV/visible light-absorbing detail primer layer and a UV/visible light-absorbing paint layer in the co-cured UV/visible light-resistant composite material vehicle fuel tank assembly.

8. The co-cured UV/visible light-resistant vehicle fuel tank assembly of claim 7, wherein the co-cured epoxy resin-based composite material substrate comprises an epoxy resin-based matrix.

9. The co-cured UV/visible light-resistant vehicle fuel tank assembly of claim 7, wherein the co-cured epoxy resin-based composite material substrate comprises a fiber reinforced epoxy resin-based matrix comprising at least one of carbon fibers, boron fibers, aramid fibers, fiberglass fibers, polyester fibers, and combinations thereof.

10. The co-cured UV/visible light-resistant vehicle fuel tank assembly of claim 7, wherein the co-cured epoxy resin-based composite material substrate comprises a carbon fiber reinforced polymer composite material.

11. The co-cured UV/visible light-resistant vehicle fuel tank assembly of claim 7, wherein the co-cured epoxy resin-based composite material substrate comprises at least one carbon fiber reinforced polymer prepreg.

12. The co-cured UV/visible light-resistant vehicle fuel tank assembly of claim 7, wherein the co-cured UV/visible light-resistant layer is configured to form the vehicle fuel tank inner surface.

13. The co-cured UV/visible light-resistant vehicle fuel tank assembly of claim 7, further comprising a fuel tank primer layer disposed to cover the co-cured UV/visible light-resistant layer, said vehicle fuel tank inner surface defined by the fuel tank primer layer.

14. The co-cured UV/visible light-resistant vehicle fuel tank assembly of claim 7, wherein inclusion of the said co-cured UV/visible light-resistant layer in the co-cured vehicle fuel tank assembly obviates the presence of at least one of a fuel tank primer layer and a UV-absorbing paint layer in the vehicle fuel tank assembly.

15. An aircraft wing assembly comprising the co-cured UV/visible light-resistant vehicle fuel tank assembly of claim 7.

16. A vehicle comprising the co-cured UV/visible light-resistant vehicle fuel tank assembly of claim 7.

17. The vehicle of claim 16, wherein the vehicle is selected from the group consisting of:

a crewed aircraft, an uncrewed aircraft, a crewed spacecraft, an uncrewed spacecraft, a crewed rotorcraft, an uncrewed rotorcraft, a crewed terrestrial vehicle, an uncrewed terrestrial vehicle, a crewed surface water borne vehicle, an uncrewed waterborne vehicle, a crewed sub-surface water borne vehicle, an uncrewed sub-surface water borne vehicle, a satellite, and combinations thereof.

18. A method for forming a co-cured UV/visible light-resistant composite material vehicle fuel tank assembly, the method comprising:

providing a co-curable epoxy resin-based composite material substrate, said co-curable epoxy resin-based composite material substrate comprising a co-curable epoxy resin-based composite material substrate first side and a co-curable epoxy resin-based composite material substrate second side;

applying a co-curable UV/visible light-resistant coating layer onto said co-curable epoxy resin-based composite material substrate second side, said co-curable UV/visible light-resistant coating layer comprising at least one of fiberglass fibers, carbon fibers, polyester fibers, aramid fibers, boron fibers, quartz, and combinations thereof, said co-curable UV/visible light-resistant coating layer applied directly onto the co-curable composite material substrate second side at an average thickness ranging from about 2 mils to about 6 mils;

co-curing the co-curable epoxy resin-based composite material substrate with the co-curable UV/visible light-resistant coating layer to form the co-cured UV/visible light-resistant composite material vehicle fuel tank assembly, said co-cured UV/visible light-resistant composite material vehicle fuel tank assembly comprising a co-cured vehicle fuel tank assembly inner surface, said co-cured vehicle fuel tank assembly inner surface consisting of a co-cured UV/visible light-resistant coating layer having a UV/visible light transmittance value of 0% to about 20% for UV/visible light wavelengths ranging from about 200 nm to about 800 nm when the co-cured UV/visible light-resistant coating layer comprises an average thickness ranging from about 2 mils to about 6 mils, said co-cured UV/visible light-resistant layer configured to define a vehicle fuel tank cavity;

wherein the co-cured UV/visible light-resistant coating layer alone is solely responsible for imparting the selected degree of UV/visible light-resistance and UV/visible light protection to the underlying co-cured epoxy resin-based composite material substrate; and wherein inclusion of the co-cured UV/visible light-resistant coating layer in the co-cured UV/visible light-resistant composite material vehicle fuel tank assembly obviates the need for the presence of at least one of a UV/visible light-absorbing detail primer layer and a UV/visible light-absorbing paint layer in the co-cured UV/visible light-resistant composite material vehicle fuel tank assembly.

19. The method of claim 18 wherein the co-curable epoxy resin-based composite material substrate comprises a fiber reinforced epoxy resin-based matrix comprising at least one of carbon fibers, boron fibers, aramid fibers, fiberglass fibers, polyester fibers, and combinations thereof.

20. The method of claim 18, wherein the co-curable epoxy resin-based composite material substrate comprises a carbon fiber reinforced polymer composite material.

21. The method of claim 18, further comprising applying a fuel tank primer layer on the co-cured UV/visible light-resistant coating layer.

* * * * *